Feb. 8, 1966   M. KATZIN   3,234,547
POLARIZATION DIVERSITY SYSTEM
Filed July 10, 1962   5 Sheets-Sheet 1
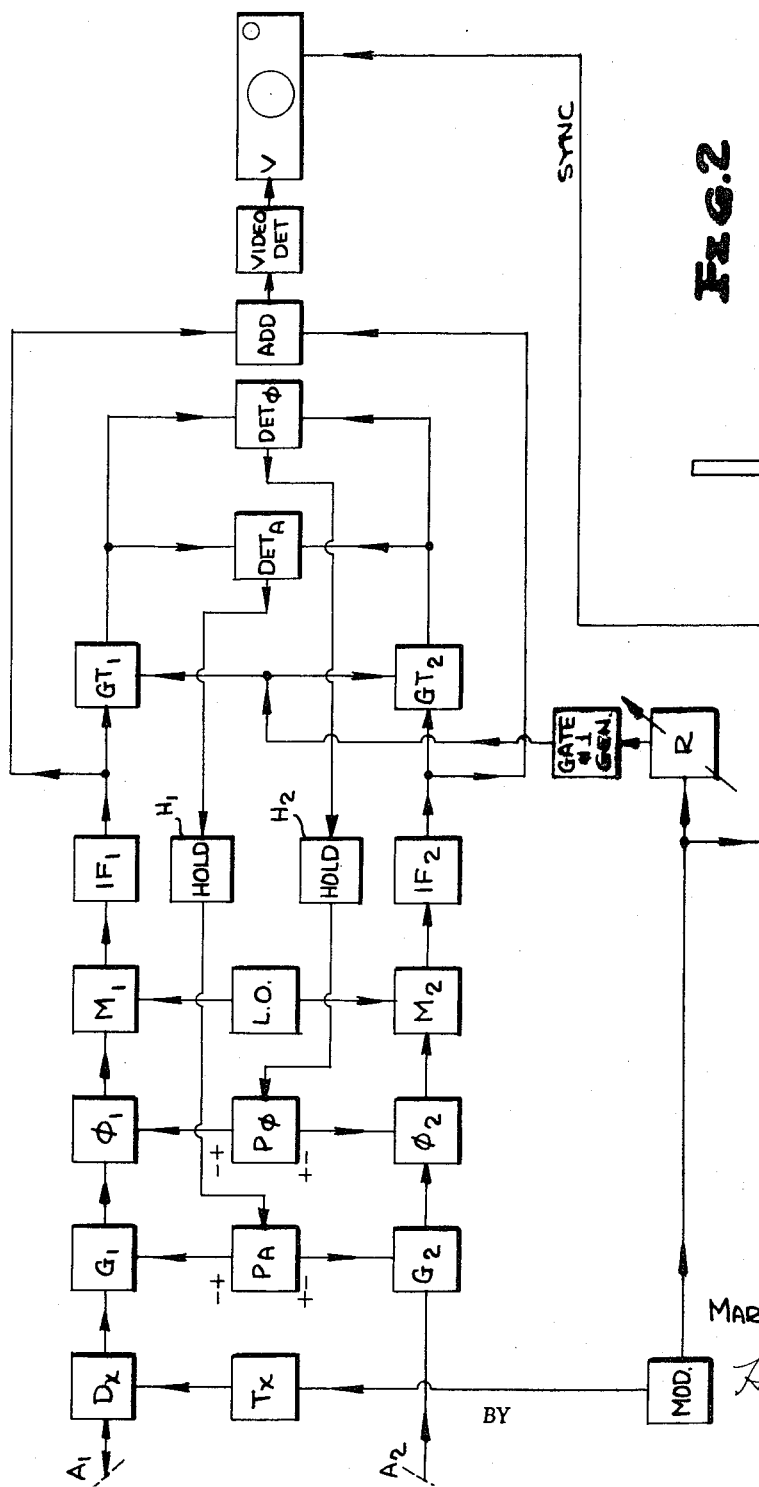
INVENTOR
MARTIN KATZIN
ATTORNEYS Feb. 8, 1966  M. KATZIN  3,234,547
POLARIZATION DIVERSITY SYSTEM
Filed July 10, 1962  5 Sheets-Sheet 2
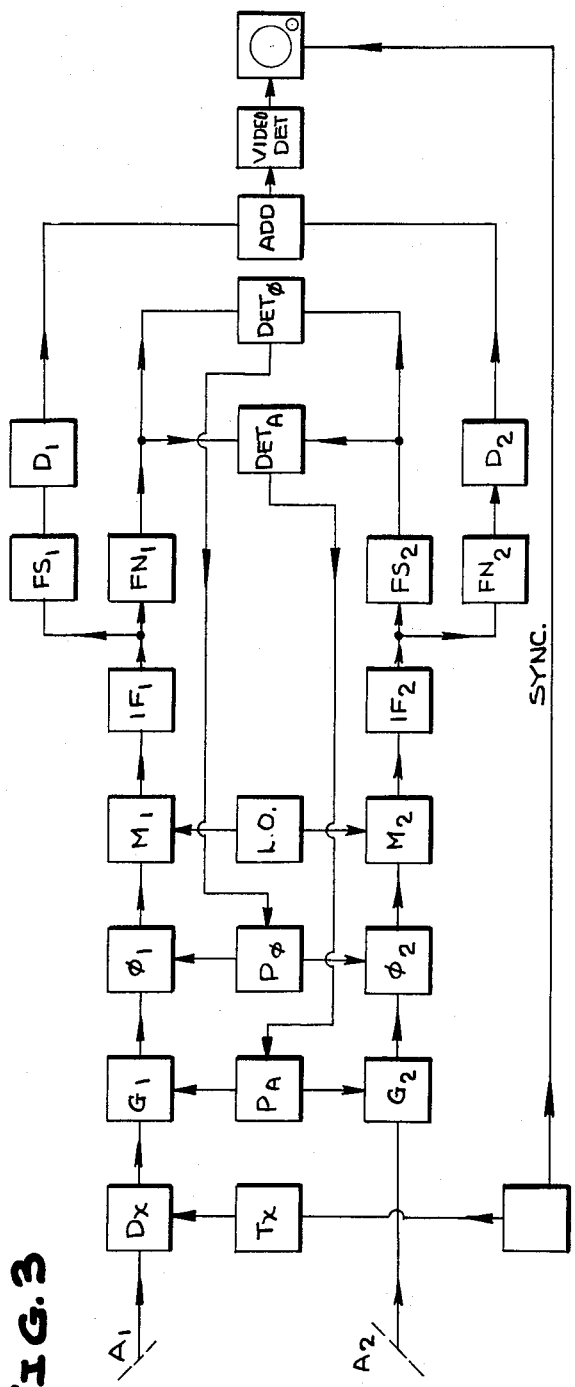
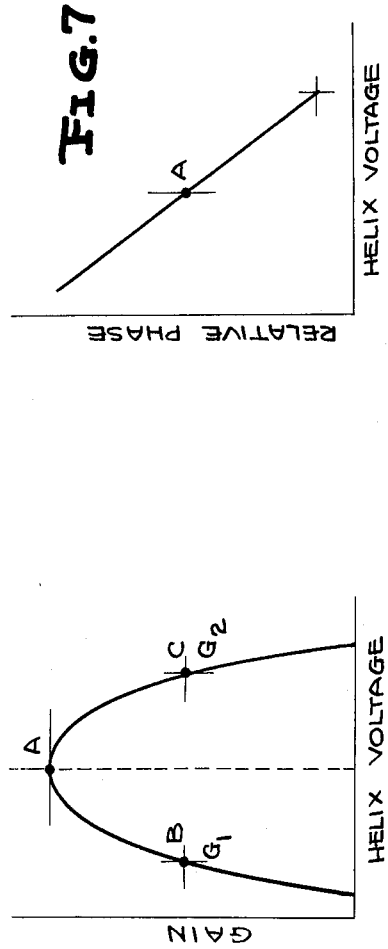
INVENTOR
MARTIN KATZIN
BY *Hurvitz & Rose*
ATTORNEYS Feb. 8, 1966  M. KATZIN  3,234,547
POLARIZATION DIVERSITY SYSTEM
Filed July 10, 1962  5 Sheets-Sheet 3

INVENTOR
MARTIN KATZIN
BY *Hurwitz & Rose*
ATTORNEYS

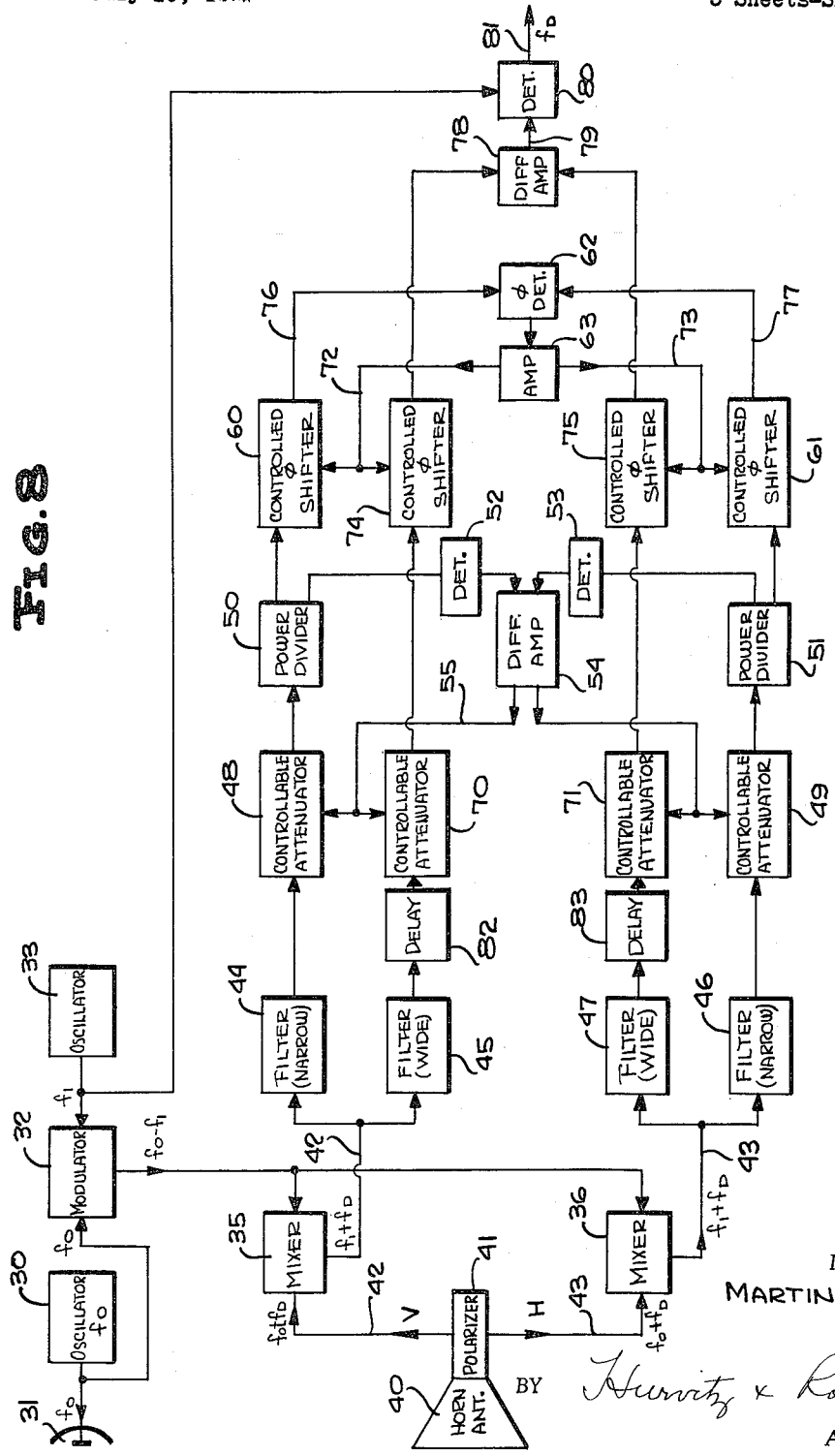

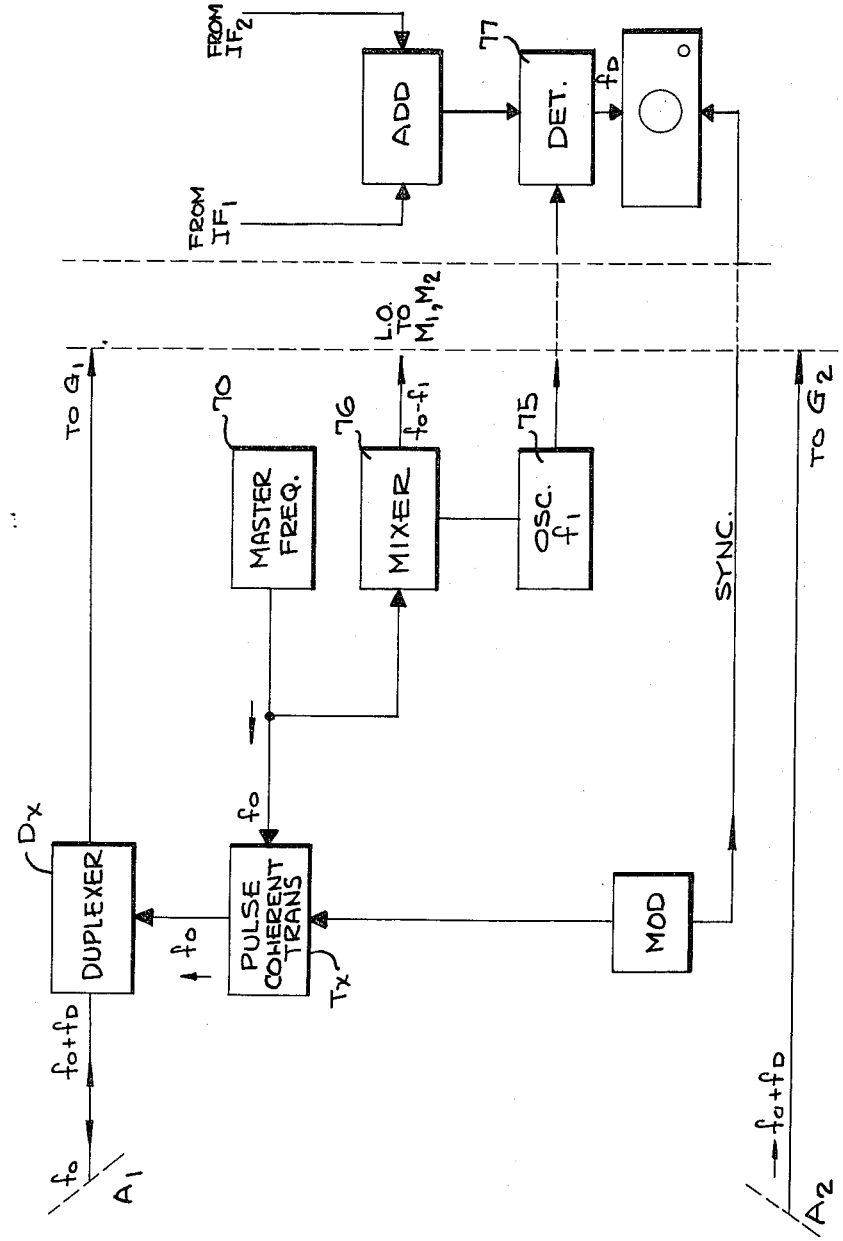

United States Patent Office 3,234,547
Patented Feb. 8, 1966

3,234,547
POLARIZATION DIVERSITY SYSTEM
Martin Katzin, 154 Fleetwood Terrace, Silver Spring, Md.
Filed July 10, 1962, Ser. No. 208,878
23 Claims. (Cl. 343—13)

This application is a continuation-in-part of my prior application, Serial No. 24,963, filed April 27, 1960, now U.S. Patent No. 3,044,062, dated July 10, 1962.

The present application relates generally to radar systems, and more particularly to systems for improving the signal to noise ratio of radar systems, and improving their capability to operate accurately in the presence of noise, decoys, clutter and the like undesired signals, wherein discrimination against the undesired signals is provided in terms of difference of polarization of the desired and undesired signal.

Briefly describing a preferred embodiment of the invention, it is assumed that a distinguishing characteristic exists as between the noise signal and the desired signal in addition to a difference in polarization of wave energies representing said signals. The term "noise" herein is not restricted to random noise but may be any undesired signal which tends to degrade a desired signal. Such difference may, for example, be represented by a bandwidth difference, as representing one simple type of difference, and a time of occurrence difference, as another, but the invention is broadly applicable regardless of the character of difference so long as that difference permits a sample of the noise to be isolated from signal plus noise.

In accordance with the invention the polarization of the noise signal is sensed, and converted to a control signal. The control signal is in turn utilized to control the polarization for which a main receiver channel provides no noise output, but some signal output, on the assumption that a polarization difference exists between the signal and the noise. More specifically the noise signal, having been isolated from signal plus noise, is divided into two polarization components. These may be denominated V and H components, for convenience, and these designations may indicate that vertical and horizontal polarization components may be utilized, but without detracting from the generality of the exposition, since the specific orientations selected for polarization are arbitrary. In a broad sense then V and H represent differently directed polarization components, which may be but need not be orthogonal. V and H components of the noise are equalized in amplitude and equalized or opposed in phase, in response to control signals derived from V and H comparison devices, and these same control signals are utilized to control the gain and the phase shift of V and H main channels which carry signal plus noise such that at the output of the main channels the noise signals will be equal in amplitude and in phase, since they were so in the supplementary or noise per se channels, but the desired signal components will in general be neither equal in amplitude nor cophasal. Accordingly by suitably combining the outputs of the main channels, the noise signal may be balanced and a residual desired signal remain.

It is accordingly a broad object of the present invention to provide a radar system capable of distinguishing between desired signal and undesired signal on the basis of differences in the polarizations of wave energies representative thereof.

It is another object of the present invention to provide a radar system for distinguishing desired signals from noise when the noise signal is considered to be any degrading signal having some difference characteristic with respect to desired signals which can be distinguished, in addition to a difference of polarization, such as time of occurrence or frequency, for example.

It is still another object of the invention to provide a radar system for distinguishing echo from noise, wherein the term noise means undesired signal, by so treating the noise signal alone in two channels that the outputs of the channels may be cancelled one with the other, and similarly treating the echo plus noise in two channels, so that the outputs of the latter channels may provide for cancellation of the noise without cancellation of the desired echo signal, provided that a difference of polarization exists between the echo signal and the noise.

The above and still further objects, features and advantages of the present invention will become apparent upon consideration of the following detailed description of one specific embodiment thereof, especially when taken in conjunction with the accompanying drawings, wherein:

FIGURE 1 is a block diagram of a radar system according to the invention;

FIGURE 2 is a wave form diagram useful in explaining the operation of the system of FIGURE 1;

FIGURES 3 and 4 are block diagrams of modifications of the system of FIGURE 1;

FIGURE 6 is a plot of the gain versus helix voltage of a TWT;

FIGURE 7 is a plot of the phase shift versus helix voltage of a TWT;

FIGURE 8 is a block diagram of a Doppler radar system according to the invention; and FIGURE 9 is a block diagram of a pulse Doppler radar system, according to the invention.

Figure 4:
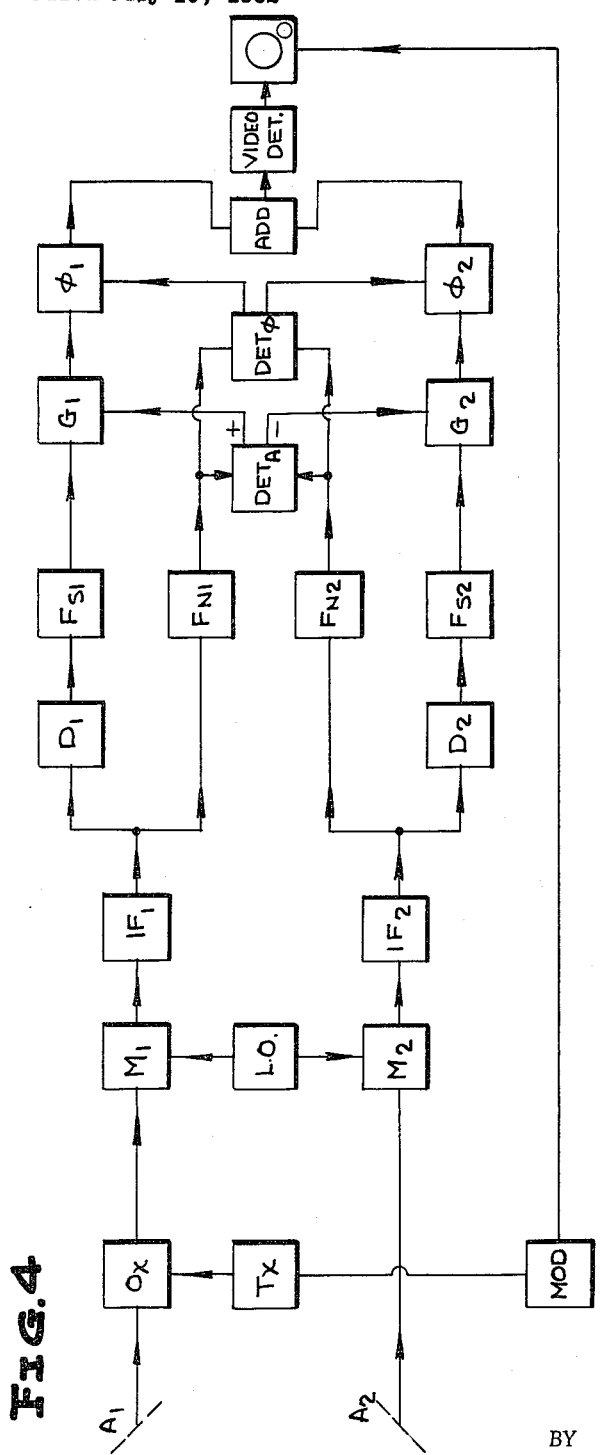

Referring now more particularly to FIGURE 1 of the drawings, $A_1$ and $A_2$ represent two preferably orthogonally polarized antennas, $A_1$ and $A_2$. For simplicity transmitter $Tx$ is shown feeding only one of the antennas $A_1$ through duplexer $Dx$. In fact, transmitter $Tx$ could feed antennas $A_1$ and $A_2$, or any combination of these, in any amplitude and phase relation. The returned echo signal is assumed jammed by noise, under which is buried the signal of interest, i.e. the received echo. The two orthogonal components of the received noise and of the received echo signal, in antennas $A_1$ and $A_2$ pass through variable gain amplifiers $G_1$ and $G_2$, and variable phase units $\phi_1$ and $\phi_2$, and on to mixers $M_1$ and $M_2$. After being mixed with the output of local oscillator voltage $Lo$ in mixers $M_1$ and $M_2$, the two signal components continue on through intermediate amplifier $IF_1$ and intermediate amplifier $IF_2$, and are summed vertorially in addition unit ADD. The sum signal leaves the addition unit and continues on down through the detector and video amplifier DV, to oscilloscope O, causing a vertical deflection. The two signal components leaving intermediate amplifiers $IF_1$ and $IF_2$ also continue on to gates $GT_1$ and $GT_2$. These two signal components can go through gate $GT_1$ and gate $GT_2$ only for a period and at a time determined by the range unit R, which controls gate generator $GG_1$. Thus the outputs of gate $GT_1$ and $GT_2$ represent small samples of the two received wave energy components. These two components continue on down to amplitude detector $DET_A$ and phase detector $DET_\phi$. In the amplitude detector $DET_A$ the two signal amplitudes are compared, and their difference is fed back to the two variable gain units $G_1$ and $G_2$, adjusting their respective gains so that the level of the two signal components is equal at addition unit ADD. In phase detector $DET_\phi$ the phase of the two signals is compared. This comparison is then used to control variable phase units $\phi_1$ and $\phi_2$, such that the phase of the two signal components is 180° out of phase at addition unit ADD. The information so developed by amplitude detector $DET_A$ and phase detector $DET_\phi$ is held, by their respective hold units $H_1$ and $H_2$, until the next repetition period of the radar system, when new information concerning signal amplitude and phase is determined and the variable gain units $G_1$ and $G_2$, and the variable phase units $\phi_1$ and $\phi_2$ are readjusted. The times of occurrence of the gating pulses to gate $GT_1$ and $GT_2$ are controlled by range unit R, which may have both automatic (not shown) and manual features. In manual operation the delay from the pulse from transmitter modulator MOD of the gating pulse is adjusted manually with a knob or crank. In the automatic feature the range unit will automatically sweep the time delay of the pulses to gating units $GT_1$ and $GT_2$ back and forth over some predetermined range interval. During the period gating pulses to gates $GT_1$ and $GT_2$ the output of addition unit ADD should approach zero. However, if at the period of these gating pulses there is only noise, but a short time later the signal of interest occurs, there will be an output from addition unit ADD at a period after the gating pulses to $GT_1$ and $GT_2$. In this event, the signal occurring after the gating pulses enter range unit R and stops the automatic sweep. Thus the system will lock in range on the desired target. Sustems of this type are well known, and accordingly are not further described.

In operation, modulator MOD keys transmitter $Tx$ and also sends a sync pulse to range unit R and to range display oscilloscope O, to start the sweep. In range unit R a pulse is developed which is delayed in range with respect to the modulator pulse. This delay may be manually controlled, or it may sweep back and forth over a range interval of interest, and lock automatically on a desired signal. The output of the range unit R controls a gate generator $GG_1$, to develop "on" gating signals for gates $GT_1$ and $GT_2$.

The outputs of hold circuits $H_1$ and $H_2$ may proceed to polarity reversers or phase splitters $P_A$ and $P_\phi$, for amplitude and phase respectively. These elements assure that the output of detectors $DET_A$ and $DET_\phi$, which may be positive or negative, are applied to gain control circuits $G_1$ and $G_2$ in opposite senses, i.e. an increase to $G_1$ is always accompanied by a decrease to $G_2$, and vice versa, and similarly for $\phi_1$ and $\phi_2$. The position of the period selected for the desired target is usually indicated on output oscilloscope O as a step, in practical systems. In the event that the target of interest has a range rate, standard circuitry could also be used to provide an automatic range tracking system.

FIGURE 2 shows what might be expected to be seen on a normal A scope type output from this type radar system. The transmitter pulse occurs at time $t_0$. During the period $t_1$ the noise jamming is apparent. Period $t_2$ corresponds to the time at which gates $GT_1$ and $GT_2$ were open. During this period we have no noise jamming, assuming that the system is operating to eliminate external noise, and there is only a little receiver set noise on the oscilloscope. The situation remains the same through time $t_3$, and during time $t_4$ we see the signal of interest. In the period $t_5$ we have only internal noise, under the assumption that the polarization characteristics of the jamming noise have not changed in this time. We see the noise during time $t_1$ because it is the longest time since the previous repetition period, when the polarization reception characteristics of the radar were modified so as to eliminate noise.

In FIGURE 1, all phase and amplitude adjustments have been made in the RF section of the receiver. These phase and amplitude adjustments, depending upon the overall band width required in the adjustment sections, could be done equally as well at the intermediate frequency. Relative amplitude adjustments in the two channels could be accomplished in any of the following ways:

(1) Adjustment of the gain of RF amplifier in either, or both, of the signal channels.

(2) Adjustment of the gain in either, or both, of the intermediate frequency amplifiers.

(3) Adjustment of the line loss in the RF portions by dissipative or reflective elements, or adjustment of line loss in the intermediate frequency channels employing dissipative or reflective units.

Relative phase adjustment in the two channels could be accomplished in any of the following ways:

(1) Adjustment of the phase in the RF lines up to the mixers or in the lines between the local oscillator and the two mixers, through the use of ferrite or varactor assemblies. The varactor assembly would be preferable in high speed applications.

(2) Through the utilization of the phase transfer characteristics of a traveling wave tube placed in either the RF lines or the lines between the local oscillator and the two mixers.

FIGURE 1 illustrates a system which operates for signal selection on the basis of time. That is to say, that a determination of the interfering signal polarization is made at a specific time, and this information is held or stored for a predetermined period during which the desired signal may be received. The noise and the desired signal have been separated on the basis of a difference in polarization, and upon the assumption that the polarization of the interfering noise has not changed for a short period after the sampling time.

In FIGURE 3 is illustrated a system which operates on the basis of frequency, i.e. in FIGURE 3 one makes use of the polarization differences between the noise jamming signal and the desired signal and also makes use of the fact that the noise jamming signal covers a much wider spectrum of frequencies than will the desired signal. The system of FIGURE 3 operates very much like the system in FIGURE 1 through intermediate frequency amplifiers $IF_1$ and $IF_2$. Up to the outputs of these two IF amplifiers the overall bandwidth of the system is more than is required to pass the desired signal. For purposes of illustration, we may assume that the bandwidth up to this point is twice the bandwidth required to pass the desired signal. The desired signal, therefore, is found in only one-half of the available bandwidth, but wide band noise jamming signal may be expected across the full bandwidth. The outputs of $IF_1$ and $IF_2$ are applied to two sets of filter networks. Filter network $FS_1$ and filter network $FS_2$ are adjusted to pass the signal frequency, while filter networks $FN_1$ and $FN_2$ are adjusted outside of the bandwidth required for the desired signal. The outputs of filter networks $FN_1$ and $FN_2$, which are amplitude compared in detector $DET_A$ and phase compared in detector phase detector $DET_\phi$ contain no components of desired signal. The outputs of amplitude detector $DET_A$ and phase detector $DET_\phi$ are used to control variable gain units $G_1$ and $G_2$ and variable phase units $\phi_1$ and $\phi_2$, in a manner similar to that described for the system in FIGURE 1, so that the outputs of the noise signal components at the input to filter network $FS_1$ and $FS_2$ are equal in amplitude and 180° out of phase. The outputs of filter networks $FS_1$ and $FS_2$ continue on through delay units $D_1$ and $D_2$ and are added vectorially in addition unit ADD. The output of the addition unit ADD is detected and amplified in detector and video amplifier DV. In addition unit ADD, since the noise components of the two channels are equal in amplitude and 180° out of phase, the noise cancels, and only the desired signal is left as output for presentation on output oscilloscope O. Since the amplitude and phase corrections for the two channels cannot be made in zero time, the output of signal of filter $FS_1$ and filter $FS_2$ would be contaminated to some degree by noise which got through the system before the phase and amplitude adjustments could be accomplished, unless delay were provided. The delays provided by delay units $D_1$ and $D_2$ are just sufficient to minimize such noise. An alternative way of obviating this difficulty is by means of the circuit shown in FIGURE 4. In this system variable gain unit $G_1$ and variable gain unit $G_2$ along with variable phase unit $\phi_1$ and variable phase unit $\phi_2$ have been inserted into the IF lines. The outputs of intermediate amplifier $IF_1$ and intermediate amplifier $IF_2$ split into two channels going through two sets of filters $FS_1$, $FS_2$ and $FN_1$, $FN_2$, as in FIGURE 3. Amplitude detector $DET_A$ and phase detector $DET_\phi$ now control the variable gain units and variable phase units in the IF line in a manner similar to that in FIGURE 3. However, because of the insertion of delay line $D_1$ and delay line $D_2$ before filter $FS_1$ and filter $FS_2$, we have compensated for the delay in adjusting phase and amplitude; that is to say, the variable gain in phase units $\phi_1$ and $\phi_2$ have been controlled by the respective detectors before the signal which would be contaminated with noise arrives at this portion of the system. In this way the cancellation in the summation unit ADD will be complete and only the desired signal will be available for presentation on output oscilloscope O. The variable gain and phase units have been shifted into the intermediate frequency lines here to show that they need not be operated in the RF portion of the system as shown in FIGURES 1 and 3. By the same token the features of FIGURE 4, that is, a delay to compensate the time required to adjust phase and amplitude, can be added to FIGURE 3 with the variable delay occurring in the RF before the variable gain and variable phase units.

Figure 5:
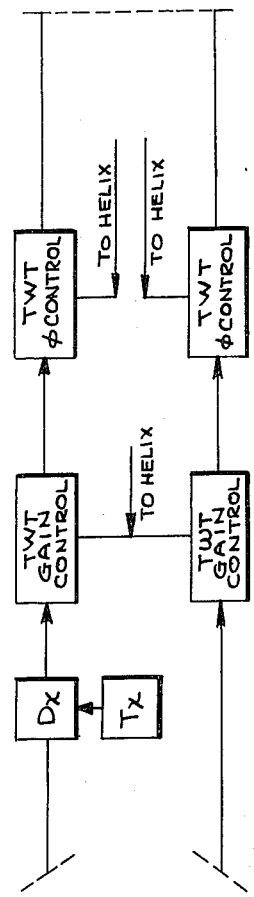
FIGURE 5 is a block diagram of the system of FIGURE 1, employing traveling wave tube (TWT) gain and phase control systems.

A particularly effective device for controlling gain and phase shift is that of using a traveling wave tube to control either or both amplitude or phase. The traveling wave tube is a good competitor as a method for controlling gain and/or phase due to its extremely wide bandwidth, allowing very rapid response of the overall system. The way in which the traveling wave tube would be used can be seen quite clearly by reference to FIGURES 6 and 7. FIGURE 6 is a plot of gain of the tube versus helix voltage. FIGURE 7 is a plot of relative phase shift through the tube versus helix voltage. Gain control could be accomplished by two different modes of applying operating voltages on the tubes. If we refer to FIGURE 1, we see that when we need more gain from $G_1$, we need less gain from $G_2$ and vice versa. Accordingly, the quiescent or steady state condition of $G_1$ could be selected as point B on FIGURE 6, while quiescent or steady state conditions for $G_2$ could be selected as point C. Then an increase in helix voltage would increase the gain in $G_1$ and decrease the gain in $G_2$. Reference is made to FIGURE 5 as exemplifying such a system. The converse, of course, would hold for a decrease in helix voltage. In the alternative, both helices may operate quiescently at point B (or C) and a phase splitter be used to shift the operating points in response to signal, in opposite senses, as in FIGURE 1. The traveling wave tube might be used for phase control, as illustrated in FIGURE 7. Both phase controllers $\phi_1$ and $\phi_2$ are quiescently biased at point A. Phase detector $DET_\phi$ would be so arranged as to feed back voltages of opposite senses to the helix on each tube. Thus if we require more phase shift in the line connected to antenna $A_1$, a less positive voltage would be fed back to the helix of variable phase tube $\phi_1$, and a more positive voltage fed back to the helix of variable phase tube $\phi_2$.

Reference is made to the June 1962 issue of Microwave Journal, page 99, wherein is provided an article by Dewirs and Swarner, describing a suitable varactor phase shift controller. Diode amplitude controls and ferrite phase shifters are sold commercially by Melabs Corporation.

The system of FIGURE 8 illustrates the system of the invention as applied to a Doppler radar system. In such a system transmission of electromagnetic microwaves occurs continuously at a frequency $f_0$, generated by oscillator 30, via antenna 31. The continuous output of oscillator 30 is converted in modulator 32, to a frequency $f_0-f_1$, the $f_1$ frequency being supplied by oscillator 33.

The reference numeral 40 denotes an antenna, preferably of the horn type, which feeds a polarizer 41 adapted to separate the signal received by the horn antenna 40 into vertical and horizontal polarization components on leads or channels 42 and 43, respectively. Assuming that the received signal derives from a moving target the received frequency will be $f_0+f_D$, where $f_D$ is a Doppler component. The components $f_0+f_D$ proceed to mixers 35, 36, where they are mixed with frequency $f_0-f_1$, to provide outputs on leads 42, 43, at frequency $f_1+f_D$. $f_1$ may be a relatively low frequency, comparable with a typical intermediate frequency used in a superheterodyne radar receiver, such as 30 mc. The signals on leads 42, 43 are composed of vertical components $V_1$, $V_2$ and horizontal components $H_1$ and $H_2$, respectively, where subscript 1 applies to signal and subscript 2 to noise. A noise signal may be assumed due to a target which is not moving at adequate velocity, so that the system is capable of discriminating between targets on the basis of a difference in their velocities, and the polarizations of their returned signal. The differences of their velocities provides the discriminatory basis on which the polarization discriminating circuits can operate. It will be understood that the utilization of vertical and horizontal components is a matter of choice, representing a convenient mode of describing and processing cross polarized signals. The vertically polarized component of the complete received signal, $V_1$ and $V_2$, is applied in parallel to signal selectors 44 and 45, of which signal selector 44 responds only to a noise component $V_1$ of the total received signal. In the case of a decoy target, having a Doppler frequency other than $f_D$, the signal selector 44 may be a narrow band filter or receiver, which is so tuned as to respond to received frequencies not pertaining to Doppler frequencies of the desired target. So selector 44 may respond to frequency $f_1$, and selector 45 to $f_1+f_D$, for example.

Similarly a horizontally polarized component of the entire received signal, $H_1+H_2$, applied to channel 43 is separated in selectors 46 and 47 respectively, the signal selector 46 abstracting the horizontally polarized component of the noise $H_1$, i.e., signal at frequency $f_1$, while the signal selector 47 passes the horizontally polarized component of both noise and desired signal, $H_1$ and $H_2$, i.e., signal at frequency $f_1+f_D$.

Considering now the noise channels alone, the $V_1$ and $H_1$ components of the noise are passed through controllable attenuators 48 and 49, the outputs of the attenuators 48 and 49 consisting of power dividers 50 and 51, respectively. Power divider 50 supplies a portion of the signal supplied thereto to an amplitude detector 52 while power divider 51 supplies the like portion of the signals applied thereto by the controllable attenuator 49, to an amplitude detector 53. The detectors 52 and 53 supply their outputs to a difference amplifier 54, the output of which consists of two D.-C. signals on leads 55 and 56, respectively, these signals representing the difference of the detected input to the difference amplifier 54 taken in opposite senses. If the $V_1$ and $H_1$ components are equal, the detectors 52 and 53 will be supplied with signals of equal amplitude and the output of the difference amplifier 54 as seen on the leads 55 and 56 will be zero. In such case the attenuators 48 and 49 will be subjected to zero level control signals, and accordingly will introduce a normal or zero level attenuation. If on the other hand the output of the detector 52 is the larger and the output of the detector 53 the smaller, indicating that the $V_1$ component is larger and the $H_1$ component smaller, signal on the lead 55 will be positively going, and on the lead 56 negatively going, with respect to the zero level, whereby the controllable attenuators 48 and 49 will be adjusted in respect to gain in opposite sense, and the control will be such as to reduce the output of the differential amplifiers to zero. It will be clear from the discussion that attenuation may be positive or negative, with respect to reference level. In a sense, the differential amplifier 54 is the error detector of a servo system, which tends to reduce amplitude error to zero. If the $H_1$ component should be greater than the $V_1$ component, the differential output from the differential amplifier 54 will be positive on lead 56 and negative on lead 55, so that attenuation introduced in the channels will be again in opposite senses such as to tend to equalize the outputs of the attenuators.

The equalized $V_1$ and $H_1$ signals are now applied to controlled phase shifters 60 and 61, respectively. The outputs of the latter are applied to a phase detector 62, which supplies to an amplifier 63 a signal representative of the phase difference of the two inputs of the phase detector 62. The amplifier 63 is arranged to provide oppositely phased D.-C. control signals to the controlled phase shifters 60 and 61, via leads 65 and 66, respectively, in opposite sense, so as to tend to equalize the phases of the output signals derivable from the controlled phase shifters 60 and 61. The phase detector 62 is then again the error detector of a servo, wherein the character of the error is a phase error, and wherein the servo loop tends to reduce the error to zero regardless of its sign.

There is now available on leads 55 and 56 two control signals, which represent the change in gain which must be introduced to the $V_2+V_1$ signal supplied by the signal selector 45 and to the $H_2+H_1$ signal supplied by the signal selector 47, in order to equalize the $V_1$ and $H_1$ components of the latter signals. These control signals, available on leads 55 and 56 are supplied to controllable attenuators 70 and 71, which duplicate the controllable attenuators 48 and 49. It then follows that at the outputs of the attenuators 70 and 71, i.e., on leads 72 and 73 respectively, are two signals $V_2+V_1$ and $H_2+H_1$, respectively, wherein the $V_1$ and $H_1$ components are equal, but wherein, in general, $V_2$ and $H_2$ components are not equal, and would only be equal if the polarization of the desired signal were the same as the polarization of the noise signal.

The amplitude equalized signals available on leads 72 and 73 are applied to controlled phase shifters 74 and 75, which duplicate, respectively, the controlled phase shifters 60 and 61, and which are in fact controlled by the same control signals as are the latter, via leads 65 and 66. Accordingly, at the output of the controlled phase shifters 74 and 75, i.e., on leads 76 and 77, appear the signals $V_2+V_1$ and $H_2+H_1$, respectively, but the $V_1$ and $H_1$ components of these signals are equalized in amplitude and in phase, whereas the $V_2$ and $H_2$ components are, in general, not equalized. The signals on channels 76 and 77 are applied to a difference amplifier, 78, which serves to cancel the $V_1$ and $H_1$ components of the total signal applied thereto, and to combine algebraically the $V_2$ and $H_2$ components, providing an output in response to the latter on lead 79.

In order to clarify the operation of the system of FIGURE 8, to this point, by way of example, it may be assumed that a noise signal is intercepted, which is plane polarized 45° from the vertical taken clockwise, whereas a desired signal simultaneously intercepted is plane polarized at 90° with respect to the noise signal, i.e. at 45° taken counterclockwise to the vertical. In this set of circumstances, the $V_1$ and $H_1$ components will be equal, in both channels, and accordingly no control signal need be supplied to the controllable attenuators 48 and 70, 49 and 71. Similarly, the phases of the noise signal components $V_1$ and $H_1$ may be equal, so that no phase shift control signal need be supplied. Therefore, no control is required or obtainable from the system for the specific set of circumstances specified, i.e. $V_1$ and $H_1$ equal and co-phasal. So far as the signal plus noise channels are concerned, the $V_1$ and $H_1$ components pass through without modification of either amplitude or phase, these signals being co-phasal and of equal amplitude at the output terminal. The $V_2$ and $H_2$ signals are likewise of equal amplitudes, since they represent 45° polarization. However, since the polarization is counterclockwise polarization, the phase relation of the $V_2$ and $H_2$ components are opposite instead of equal. Accordingly the difference amplifier 78 provides twice the output available on either input channels 76 or 77 alone, and a maximum output signal representative of the desired signal to the exclusion of the noise signal becomes available on output lead 79.

For any set of circumstances conceivable, i.e. whether or not one or the other polarizations is rotating, or if both are rotating, whether the rotation is in the same sense or in opposite sense, an output signal appears from the difference amplifier 78 whenever the polarization of the two signals is not the same.

The control effects, in the several channels, involving control of amplitude and phase of V and H components can be arranged to take place in substantially real time, implying that these occur substantially instantaneously. In terms of current state of the art capabilities, this control can be effected in a few millimicroseconds. Such rapidity of response enables the system to achieve and maintain differential response as between signal and noise, in the case of pulse radar systems, for example, substantially throughout each pulse.

This capability is important in maintaining the discrimination against the noise in spite of variations in the polarization characteristics of said noise with time.

The output of differential amplifier 78 on lead 79 is applied to a detector 80, to which is also applied the output of oscillator 33, i.e. $f_1$. Since the input to detector 80 is at frequency $f_1+f_D$, the output may be at frequency $f_D$, on lead 81.

In order to assure that the polarization control system may have time to act, a slight delay may be introduced following filters 44, 45, in terms of delay units 82 and 83.

While the system of FIGURE 8 has been described as utilizing Doppler frequencies below a desired range of values to eliminate decoy targets, the desired range pertaining to desired targets, i.e. those moving within a desired range of velocities, the philosophy of the system equally permits the treatment of signals deriving from targets moving at greater than a specified speed, as noise or undesired signal.

While the various systems exemplifying the invention have been described as radar systems, the concepts involved are applicable to radar systems, i.e. those employing coherent light or infra-red wave energy. Sources of such coherent wave energy are called lasers.

In the event a decoy target is sufficiently different in velocity that its Doppler frequency can be removed by filtering from the Doppler frequency of a desired target it might appear that the present invention is useless. However, even in this case the signal to noise ratio of the desired signal may be improved, since there may be Doppler spectra deriving from the true and decoy targets, and these spectra may overlap.

The more useful situation occurs when a cloud of decoys is employed, all having similar polarizations but different velocities. In such case, some of the decoys may have the same velocity as, but different polarizations than, the true target, and the effect of these on the desired signal can be eliminated.

The system of FIGURE 1 may be modified as in FIGURE 9, to provide a pulsed Doppler radar system, improved according to the principles of the present invention.

The pulsed Doppler radar system differs from the more conventional radar system in that the transmitted pulses and the local oscillator signals are both derived from a common master oscillator, so that they are coherent and locked.

According to the invention, a master oscillator 70 provides wave energy at frequency $f_0$ to a coherent transmitter T$x$ which is pulsed by a modulator MOD. The frequency $f_0$ is then the transmitted frequency, passing via duplexer Dx to antenna $A_1$, as in FIGURE 1. The modulator MOD also provides sync pulse to the oscilloscopic indicator O.

The output of oscillator 70, at frequency $f_0$, may then be converted to local oscillator frequency $f_0-f_1$, by mixing with the output of oscillator 75, at frequency $f_1$, in a mixer 76. The output of addition unit ADD, corresponding with unit ADD of FIGURE 1, will contain a Doppler component $f_D$, which can be detected by mixing in detector 77 with frequency $f_1$, deriving from oscillator 75. The nominal IF frequency of the system is $f_1$, since $f_0$ is the carrier frequency and $f_0-f_1$, the local oscillator frequency, but since $f_0$ in the return signal acquires a Doppler component $f_D$, the IF frequency in fact is $f_1+f_D$, responsive to a moving target. The frequency $f_D$, selected from the output of detector 77 for desired target velocities, and applied to the video terminal of oscilloscope indicator O, enables range to be presented for any target velocity or velocities, but excludes indications from non-moving targets.

A considerable number of MTI, or moving target indication, radars are disclosed in chapter 16 of Radiation Laboratory Series 1, by Ridenour, entitled "Radar System Engineering," published by McGraw-Hill. It will be obvious that any of these systems lend themselves to modification, according to the principles of the present invention as exemplified in any of FIGURES 1, 3, 4, 7, 8, 9. The modification of FIGURE 1, to produce FIGURE 9 is accordingly desired to be non-limiting, but rather exemplary, of the invention as applied to pulsed Doppler systems.

While I have described and illustrated one specific embodiment of the present invention, it will become apparent that variations of the specific details of construction may be resorted to without departing from the true spirit and scope of the invention as defined in the appended claims.

What I claim is:

1. A radar system, including means for transmitting pulses toward a target, and a receiver for detecting return from said target, wherein said return is contaminated by noise, said noise and said return being waves having different polarizations, means responsive to polarization of said noise alone for modifying the relative amplitudes and phases of polarization components of said return and said noise such that the noise components are cancellable, leaving a residue composed of return only, and means responsive to said return for indicating range of said target.

2. The combination according to claim 1 wherein is provided means for generating periodic control signals representative of departures from predetermined values of said relative amplitudes and phases, said means for modifying being responsive to said control signals.

3. The combination according to claim 2 wherein said control signals are generated at times antecedent to returns from a predetermined range.

4. The combination according to claim 3 wherein is provided means for storing said control signals over each period between returns.

5. The combination according to claim 1 wherein is provided means for separating said noise from said return on a time basis, said last means including means for sampling said noise in absence of said return.

6. The combination according to claim 1 wherein is provided means for separating said noise from said return on a frequency basis, said last means including means for sampling said noise at a different frequency than the frequency of said return.

7. The combination according to claim 1 wherein said receiver is a superheterodyne receiver and wherein said means for modifying relative amplitudes and phases operates at intermediate frequency.

8. A radar system, including means for transmitting electromagnetic waves toward a target, and a receiver for detecting return from said target, wherein said return is contaminated by noise, said noise and said return being waves having different polarizations, means responsive to polarization of said noise alone for modifying the relative amplitudes and phases of polarization components of said return and said noise such that the noise components are cancellable, leaving a residue composed of return only, and means responsive to said return for indicating range of said target, and means responsive to said return for indicating the presence of said target.

9. A system according to claim 8 wherein the radar is a C.W. Doppler radar system.

10. A system according to claim 8 wherein the radar is a pulsed Doppler radar system.

11. A radar system, including means for transmitting electromagnetic waves toward a desired target and a receiver for detecting return from said desired target, wherein said return is contaminated by undesired signals, said undesired signals and said return being waves having different polarizations, means responsive to polarization of said noise alone for modifying the relative amplitudes and phases of polarization components of said return and said noise such that the noise components are cancellable, leaving a residue composed of return only, and means responsive to said return for indicating range of said target.

12. The combination according to claim 11 wherein said undesired signals represent return from an undesired target having a velocity distinguishable from the velocity of said desired target.

13. A target acquisition system, including means for transmitting wave energy toward a target and for detecting desired return from said target, wherein said desired return may be contaminated by undesired wave energy having polarization distinguishable from the polarization of said desired return, means responsive only to the polarization of said undesired wave energy at said receiver and for indicating the presence of said target in response only to said desired return.

14. A target indicating and acquisition system comprising means for transmitting wave energy toward a target and for detecting target return contaminated by noise, said return and noise being waves having different polarizations, comprising first and second channels separately responsive to waves of different polarizations, each of said channels including means for deriving a first replica of noise and signal of the wave applied thereto and a second replica of only the noise of the wave applied thereto, means responsive only to said second replicas for varying the relative gain and phase shift of said first and second channels so that the second replicas are instantaneously equal in amplitude and the noise components in the first replicas are instantaneously equal in amplitude, means for combining the first replicas deriving from said channels to derive an output signal wherein the noise components are cancelled, and means responsive to the wave energy deriving from said means for transmitting and said output signal for indicating the presence of a target.

15. The system of claim 14 wherein said wave energy is transmitted as discrete pulses, said gain and phase shift varying means includes means for periodically deriving control signals indicative of the relative amplitude and phase of the second replicas, said control signals being derived only in an interval between the end of each transmitted pulse and the beginning of each received return pulse.

16. The system of claim 14 wherein said replica deriving means comprises a first filter having a bandwidth wide enough to include both noise and return and a second filter having a bandwidth wide enough to only include noise, means for deriving a first control signal in response to an amplitude comparison of the signals deriving from the second filters of both channels, means for deriving a second control signal in response to a phase comparison of the signals deriving from the second filters of both channels, and means for varying the relative gain and phase shift of said first and second channels in response to said first and second control signals.

17. The system of claim 16 wherein said means for varying are connected to receive signal information prior to application of said signal information to both said filter means.

18. The system of claim 17 further including means for delaying the signal deriving from the first filter in both of said channels, said delay means introducing substantially the same degree of delay as is introduced in controlling said channels.

19. The system of claim 16 wherein said means for varying are connected to vary the signal deriving from said first filters.

20. The system of claim 19 further including means for delaying the signal applied to said means for varying, said delay means introducing substantially the same degree of delay as is introduced in controlling said channels.

21. The system of claim 16 wherein each of said channels includes delay means for compensating in the first replicas substantially the same degree of delay as is introduced in controlling said channels.

22. The system of claim 14 including means for varying the relative amplitudes and phases of the signals in the first and second channels in equal and opposite senses, said last named means comprising a first traveling wave tube in said first channel, a second traveling wave tube in cascade with said first traveling wave tube, a third traveling wave tube in said second channel, a fourth traveling wave tube in cascade with said third traveling wave tube, said traveling wave tubes having a dome-shaped gain versus helix voltage characteristic including a relatively flat peak and oppositely sharply sloping sides descending from said peak, means setting operating points for said first and third traveling wave tubes symmetrically on opposite ones of said sloping sides, said traveling wave tubes having a linear phase shift with helix voltage characteristic, means setting operating points for said second and fourth traveling wave tubes at said peak, means for deriving a first control signal indicative of the relative amplitude of the second replicas, said first control signal being applied to the helices of said first and third traveling wave tubes, means for deriving a second control signal indicative of the relative phases of said second replicas, said second control signal being applied to the helices of said second and fourth traveling wave tubes.

23. The system of claim 14 including means for varying the amplitudes of the signals in the first and second channels in equal and opposite senses, said last named means comprising first and second traveling wave tubes in said first and second channels, respectively, said traveling wave tubes having a dome-shaped gain versus helix voltage characteristic including a relatively flat peak and oppositely sharply sloping sides descending from said peak, means setting operating points for said first and third traveling wave tubes symmetrically on opposite ones of said sloping sides, and means for deriving a control signal indicative of the relative amplitude of the second replicas, said control signal being supplied to the helices of said traveling wave tubes.

References Cited by the Examiner
UNITED STATES PATENTS

| | | | |
|---|---|---|---|
| 2,116,696 | 5/1938 | De Monge | 325—371 |
| 2,175,270 | 10/1939 | Koch | 343—100 |
| 2,656,422 | 10/1953 | Loper | 330—131 |
| 3,039,089 | 6/1962 | McMurtrey | 343—5 |
| 3,044,062 | 7/1962 | Katzin | 343—100 |
| 3,083,341 | 3/1963 | While et al. | 330—132 |

CHESTER L. JUSTUS, *Primary Examiner.*

KATHLEEN CLAFFY, *Examiner.*